United States Patent
Matsui

(10) Patent No.: US 8,729,821 B2
(45) Date of Patent: May 20, 2014

(54) SEMICONDUCTOR LIGHT SOURCE LIGHTING CIRCUIT AND CONTROL METHOD

(75) Inventor: Kotaro Matsui, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 314 days.

(21) Appl. No.: 13/183,553

(22) Filed: Jul. 15, 2011

(65) Prior Publication Data

US 2012/0019170 A1 Jan. 26, 2012

(30) Foreign Application Priority Data

Jul. 23, 2010 (JP) ................. 2010-165566

(51) Int. Cl.
H05B 37/02 (2006.01)

(52) U.S. Cl.
USPC ............ 315/291; 315/294; 315/224; 315/312

(58) Field of Classification Search
CPC ........... H05B 33/0833; H05B 33/0848; H05B 33/0896
USPC ............. 315/77, 82, 291, 294, 247, 224, 312, 315/307–309, 225
See application file for complete search history.

(56) References Cited

U.S. PATENT DOCUMENTS

| | | | | |
|---|---|---|---|---|
| 7,312,783 B2 * | 12/2007 | Oyama | ......................... | 345/102 |
| 7,327,051 B2 * | 2/2008 | Ito et al. | ....................... | 307/10.8 |
| 7,352,135 B2 * | 4/2008 | Shiotsu et al. | ................ | 315/247 |
| 7,446,481 B2 * | 11/2008 | Kang et al. | ................ | 315/185 R |
| 8,421,424 B2 * | 4/2013 | Ishii | .............................. | 323/222 |

FOREIGN PATENT DOCUMENTS

| | | |
|---|---|---|
| JP | 02-239398 A | 9/1990 |
| JP | 2005-29019 A | 2/2005 |
| JP | 2006-114279 | 4/2006 |
| JP | 2008-300209 A | 12/2008 |
| JP | 2009-231580 | 10/2009 |
| JP | 2010-92676 A | 4/2010 |

OTHER PUBLICATIONS

Japan Patent Office Action in JP Patent Application No. 2010-165566 (dated Feb. 18, 2014).

* cited by examiner

*Primary Examiner* — Haiss Philogene
(74) *Attorney, Agent, or Firm* — Fish & Richardson P.C.

(57) ABSTRACT

A semiconductor light source lighting circuit includes a transistor and a current detection resistor provided in series in a semiconductor light source current supply path, a control circuit for controlling the transistor so as to decrease any difference between the voltage occurring at the current detection resistor and a reference voltage, and a bypass resistor to establish a bypass path for the current supplied to the semiconductor light source, where a first end of the bypass path is located at a connection node between the transistor and the semiconductor light source.

5 Claims, 4 Drawing Sheets

SEMICONDUCTOR LIGHT SOURCE LIGHTING CIRCUIT AND CONTROL METHOD

CROSS-REFERENCE TO RELATED APPLICATION(S)

The present application claims the benefit of priority of Japanese Patent Application No. 2010-165566, filed on Jul. 23, 2010. The disclosure of that application is incorporated herein by reference.

TECHNICAL FIELD

This disclosure relates to a semiconductor light source lighting circuit for driving a semiconductor light source and to a control method for a semiconductor light source lighting circuit.

BACKGROUND

Recently, Light Emitting Diodes (LEDs) with long lifespan and low power consumption are being used in vehicle lamps, such as headlights, in place of traditional filament halogen lamps. A lighting control circuit is needed for adjusting the current flowing through an LED when the LED is employed as a light source due to the brightness of the LED being dependent on the size of current flowing through the LED.

There are descriptions of such lighting control circuits, for example the LED drive module described in JP-A-2009-231580 and the lighting control circuit described in JP-A-2006-114279.

A transistor is provided on the current path flowing to the LED in related circuits, such as the LED drive module of JP-A-2009-231580 and the lighting control circuit of JP-A-2006-114279, in which the current flowing to the LED is controlled by controlling current flowing in the transistor.

However, in the circuit configurations of JP-A-2009-231580 and JP-A-2006-114279, the higher the input voltage to the lighting control circuit, the greater the power loss in the transistor. Transistors in the foregoing circuit configurations have threshold power losses which are nominal values for the maximum power loss the terminal can withstand. However if the input voltage to the lighting control circuit is too high then concern arises of the power loss in the transistor exceeding this threshold power loss.

SUMMARY

The present disclosure is directed toward semiconductor light source lighting circuits that drive semiconductor light sources and methods for controlling the semiconductor light source lighting circuits. Embodiments described herein are directed towards semiconductor light source lighting circuits having a reduced power loss incurred by a transistor in the path of current supplied to a semiconductor light source.

In some aspects, the disclosure relates to a semiconductor light source lighting circuit that includes a transistor and a current detection resistor provided in series in a path of current supplied to a semiconductor light source, a control circuit for controlling the transistor so as to decrease any difference between the voltage occurring at the current detection resistor and a reference voltage, and a bypass resistor to configure a bypass path for the current supplied to the semiconductor light source, with a first end of the bypass path at a connection node between the transistor and the semiconductor light source.

By providing the bypass path for current supplied to the semiconductor light source, the power loss in the transistor can be reduced.

In some aspects, the disclosure relates to a control method for controlling a semiconductor light source lighting circuit that supplies current to a semiconductor light source, in which each circuit element is controlled such that both the following ranges exist: a first range of input voltages in which the size of current flowing in a transistor provided in a path of current supplied to the semiconductor light source lighting circuit changes with changes to the input voltage to the semiconductor light source lighting circuit; and a second range of input voltages, on the high voltage side of the first range, in which the power loss in the transistor is smaller than the maximum value of power loss within the first range.

Controlling each circuit element can include determining circuit constants such that both ranges exist. Alternatively, controlling each circuit element can include providing circuit elements such that both ranges exist.

In some implementations, the first range and the second range can be provided as the input voltages in the semiconductor light source lighting circuit.

Appropriate combinations of the above configuration elements, mutual substitution between configuration elements and expressions in apparatus, method and system may be effective as implementations of the invention. In some implementations, advantages of the circuit and method disclosed herein include a reduction of the power loss incurred by the transistor in the path of current supplied to the semiconductor light source.

Other aspects, features and advantages will be readily apparent from the detailed description, the accompanying drawings and the claims.

DETAILED DESCRIPTION

Figure 1:
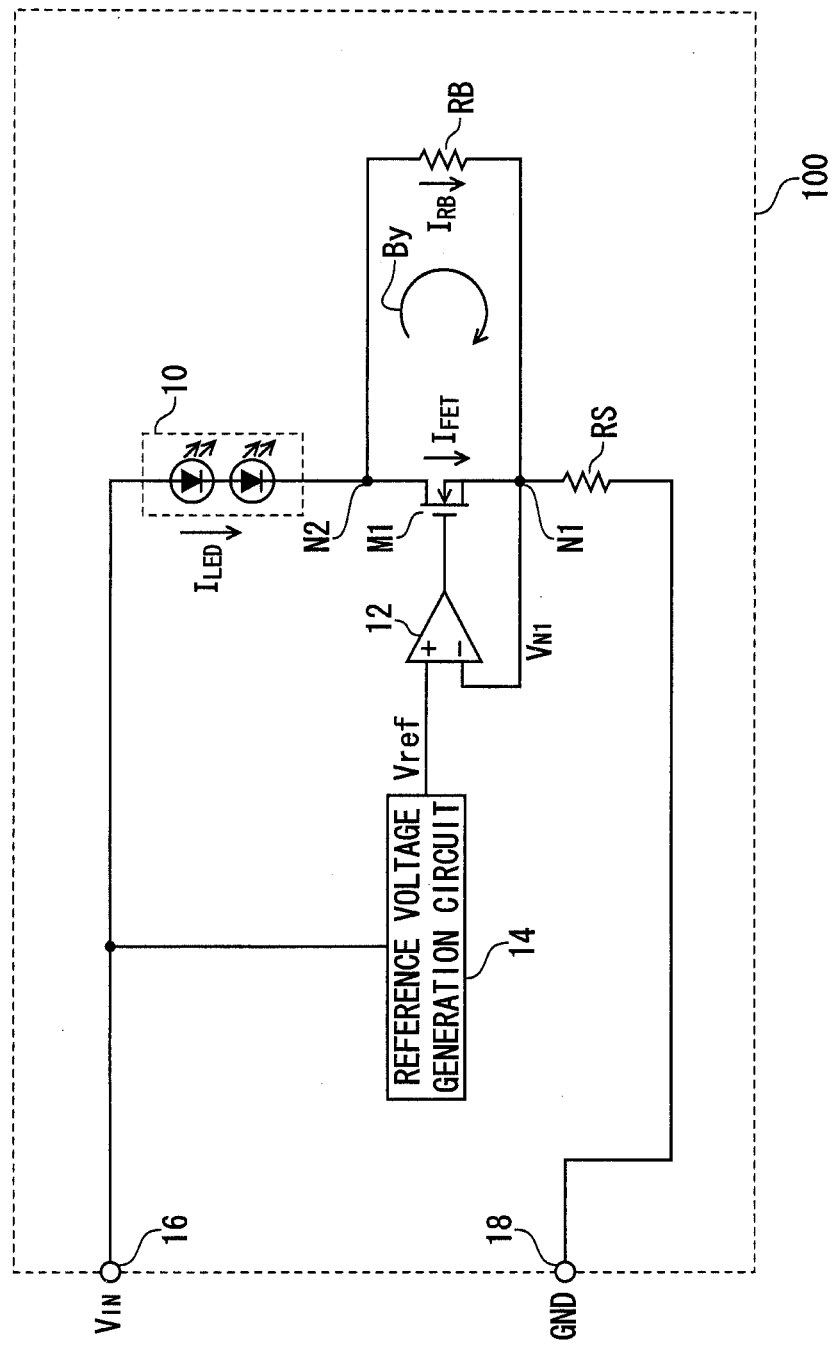
FIG. 1 is a circuit diagram illustrating an example of a semiconductor light source lighting circuit according to a first embodiment.

Several exemplary embodiments are described herein, with reference to the drawings. The same or similar configuration elements, components, signals in the drawings are allocated the same reference numerals, and duplicate explanation thereof is omitted as appropriate. The references allocated to voltages, currents and resistors are employed to indicate their respective voltage values, current values and resistance values as appropriate.

In the specification the expression "a state in which member A is connected to member B" includes cases in which the member A and the member B are directly physically connected to each other, and also cases in which the member A is connected to member B indirectly through another member having little influence on the electrically connected state of member A and member B. Similarly, the expression "a state in which member C is provided between member A and member B" includes both cases in which member A and member C, and/or member B and member C are directly connected, as well as cases in which these members are connected indirectly through another member having little influence on the electrically connected state of the members.

First Exemplary Embodiment

FIG. 1 is a circuit diagram illustrating an example of a semiconductor light source lighting circuit 100 according to a first embodiment. The semiconductor light source lighting circuit 100 includes a semiconductor light source 10, an operation amplifier 12, a reference voltage generation circuit 14, an input voltage terminal 16, an earth terminal 18, an N-channel field effect transistor M1, a bypass resistor RB, and a current detection resistor RS. An input voltage $V_{IN}$, such as a battery voltage, is externally applied to the input voltage terminal 16. The earth terminal 18 is connected to earth.

In the semiconductor light source lighting circuit 100 the bypass resistor RB is connected in parallel to the N-channel field effect transistor M1. This gives increased power loss in the bypass resistor RB as the input voltage $V_{IN}$ is increased, thereby reducing the power loss in the N-channel field effect transistor M1 by a corresponding amount. As a result a configuration is achieved in which the power loss in the N-channel field effect transistor M1 is less than a certain amount.

The semiconductor light source 10 is configured with two LEDs connected in series. The anode of a one LED at a first end of the semiconductor light source 10 is connected to the input voltage terminal 16. The cathode of the other LED at the second end of the semiconductor light source 10 is connected to the drain of the N-channel field effect transistor M1 and to a first end of the bypass resistor RB. The current flowing in the semiconductor light source 10 is indicated as LED current $I_{LED}$.

The N-channel field effect transistor M1 and the current detection resistor RS are provided in series on the path of current supplied to the semiconductor light source 10. The source of the N-channel field effect transistor M1 is connected to the first end of the current detection resistor RS, and the earth terminal 18 is connected to the second end of the current detection resistor RS.

The operation amplifier 12 and the reference voltage generation circuit 14 configure a control circuit. The control circuit controls the N-channel field effect transistor M1 to decrease any difference between the voltage drop occurring in the current detection resistor RS and a specific reference voltage Vref. The reference voltage generation circuit 14 receives power supplied from the input voltage terminal 16, generates the reference voltage Vref corresponding to a desired LED current $I_{LED}$ and applies the reference voltage Vref to the non-inverting input terminal of the operation amplifier 12. A first connection node voltage $V_{N1}$ at a first connection node N1 between the source of the N-channel field effect transistor M1 and the first end of the current detection resistor RS is applied to the inverting input terminal of the operation amplifier 12. The output terminal of the operation amplifier 12 is connected to a gate of the N-channel field effect transistor M1. The operation amplifier 12 controls the gate voltage of the N-channel field effect transistor M1 to decrease any difference between the reference voltage Vref and the first connection node voltage $V_{N1}$.

The bypass resistor RB is provided so as to configure a bypass path By for current supplied to the semiconductor light source 10. At least a portion of the current supplied to the semiconductor light source 10 detours past the N-channel field effect transistor M1 by flowing through the bypass path By. At a first end of the bypass path By lies a second connection node N2 between the drain of the N-channel field effect transistor M1 and the second end of the semiconductor light source 10. The first connection node N1 lies at the second end of the bypass path By. Namely, the first end of the bypass resistor RB is connected to the second connection node N2 and the second end of the bypass resistor RB is connected to the first connection node N1.

Figure 2:
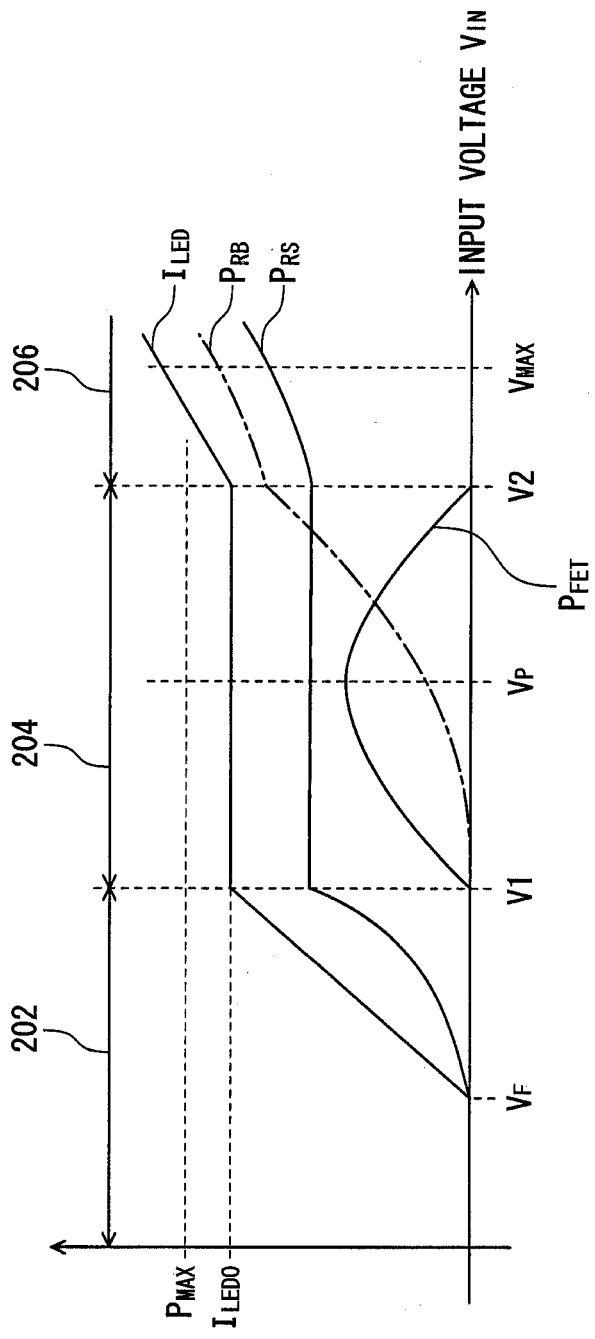
FIG. 2 is a diagram illustrating how circuit parameters change with input voltage in the semiconductor light source lighting circuit shown in FIG. 1.

The operation of the semiconductor light source lighting circuit 100 will now be described. FIG. 2 is a diagram illustrating how circuit parameters change against the input voltage $V_{IN}$ in the semiconductor light source lighting circuit 100 shown in FIG. 1. The LED current $I_{LED}$, a power loss $P_{RS}$ in the current detection resistor RS and a power loss $P_{FET}$ in the N-channel field effect transistor M1 are each shown by solid lines, and a power loss $P_{RB}$ in the bypass resistor RB is shown by a single-dot broken line.

A first range 202 of the input voltage $V_{IN}$ includes the range where the reference voltage Vref is greater than the first connection node voltage $V_{N1}$. The following relationships between each of the parameters are satisfied in the first range 202:

$$I_{LED} = \frac{(V_{IN} - V_F)}{RS} \qquad \text{Equation (1)}$$

$$P_{FET} = (V_{IN} - V_F - V_{N1}) \times I_{LED} \qquad \text{Equation (2)}$$

in which $V_F$ is a combined value of the forward voltages of the two LEDs constituting the semiconductor light source 10. It can be seen from Equation (1) that the semiconductor light source 10 starts being turned on when the input voltage $V_{IN}$ exceeds the combined value $V_F$ of the forward voltages, and the LED current $I_{LED}$ increases as the input voltage $V_{IN}$ increases.

Since the following holds:

$$(V_{IN} - V_F - V_{N1}) = 0 \qquad \text{Equation (3),}$$

it follows that:

$$P_{FET} = 0 \qquad \text{Equation (4).}$$

In other words, since the N-channel field effect transistor M1 is ON the power loss in the N-channel field effect transistor M1 is effectively zero.

A second range 204 of input voltages $V_{IN}$ includes a range where reference voltage Vref is equal to the first connection node voltage $V_{N1}$. The lower limit of the second range 204, namely the minimum value of the input voltage $V_{IN}$ where reference voltage Vref is equal to the first connection node voltage $V_{N1}$ is denoted V1. The following relationships hold between each of the parameters in the second range 204:

$$I_{LED} = \frac{V_{ref}}{RS}, \qquad \text{Equation (5)}$$

$$P_{FET} = (V_{IN} - V_F - V_{ref}) \times I_{FET}, \qquad \text{Equation (6)}$$

$$I_{FET} = I_{LED} - I_{RB} = \frac{V_{ref}}{RS} - \frac{(V_{IN} - V_F - V_{ref})}{RB} \qquad \text{Equation (7)}$$

in which FET current $I_{FET}$ is the current flowing between the drain and source of the N-channel field effect transistor M1, and bypass current $I_{RB}$ is the current flowing in the bypass resistor RB. It can be seen from Equation (5) that LED current $I_{LED}$ does not depend on input voltage $V_{IN}$ and is a constant value $I_{LED\_O}$. It can also be seen from Equation (7) that FET current $I_{FET}$ changes as the input voltage $V_{IN}$ changes.

From Equation (5), Equation (6) and Equation (7) it follows that:

$$P_{FET} = (V_{IN} - V_F - V_{ref}) \times \left( \frac{V_{ref}}{RS} - \frac{(V_{IN} - V_F - V_{ref})}{RB} \right). \quad \text{Equation (8)}$$

As shown in FIG. 2, in the second range 204, the power loss $P_{FET}$ increases in the N-channel field effect transistor M1 in the lower part of the range of the input voltage $V_{IN}$. However, when the input voltage $V_{IN}$ has reached a value $V_p$ the power loss $P_{FET}$ peaks, and when the input voltage $V_{IN}$ is increased further from this point the power loss $P_{FET}$ decreases, and becomes effectively zero when the input voltage $V_{IN}$ reaches an upper limit value V2 to the second range 204. Considering that the power loss $P_{FET}$ of the N-channel field effect transistor M1 is effectively zero in both the first range 202 and in a third range 206, described later, this means that the power loss $P_{FET}$ of the N-channel field effect transistor M1 reaches a maximum within the second range 204.

In the semiconductor light source lighting circuit 100 each of the circuit constants are set such that the maximum value of the power loss $P_{FET}$ of the N-channel field effect transistor M1 is lower than the threshold power loss $P_{MAX}$ of the N-channel field effect transistor M1. At the upper limit value V2 of the second range 204 the bypass current $I_{RB}$ is equal to the LED current constant value $I_{LED\_O}$.

The peak power of the N-channel field effect transistor M1 is computed as the power of the N-channel field effect transistor M1 at input voltage $V_{IN} (=V_p)$ according to:

$$\frac{\partial P_{FET}}{\partial V_{IN}} = 0 \quad \text{Equation (9)}$$

The third range 206 of input voltage $V_{IN}$ is a range in which reference voltage Vref is less than a first connection node voltage $V_{N1}$. In the semiconductor light source lighting circuit 100 a maximum value $V_{MAX}$ of input voltage $V_{IN}$ is set in the third range 206. The third range 206 is positioned on the high voltage side of the second range 204 so that the third range 206 includes values on the high end of the second range 204.

The following relationships are satisfied between each of the parameters in the third range 206:

$$I_{LED} = \frac{(V_{IN} - V_F)}{RS + RB}, \quad \text{Equation (10)}$$

$$P_{FET} = (V_{IN} - V_F - V_{N1}) \times I_{FET}. \quad \text{Equation (11)}$$

It can be seen from Equation (10) that the LED current $I_{LED}$ increases together with the input voltage $V_{IN}$.

When reference voltage Vref is less than the first connection node voltage $V_{N1}$, it follows that:

$$I_{FET} = 0 \quad \text{Equation (12)}.$$

From Equation (11) and Equation (12) it follows that:

$$P_{FET} = 0 \quad \text{Equation (13)}$$

Namely, due to the N-channel field effect transistor M1 being OFF in the third range 206, the power loss $P_{FET}$ in the N-channel field effect transistor M1 is effectively zero.

An example of parameters and circuit constants for the semiconductor light source lighting circuit 100 in the first exemplary embodiment is as follows:
Input Voltage $V_{IN}$=9 to 16V;
Operating value and current of LED=3.3V, 330 mA
(In FIG. 2, LED current $I_{LED}$ in the second range 204 is 330 mA and, in the third range 206 the LED current $I_{LED}$ increases together with the input voltage $V_{IN}$);
Bypass Resistor RB=about 40 Ω;
Current Detection Resistor RS=about 14 Ω;
$V_F$=2.5V×2=5V;
V1=11 to 12V ($V_{ref}$=about 5V);
Vp=13.5V;
V2=16V; and
$V_{MAX}$=18V.

In the semiconductor light source lighting circuit 100 of the first exemplary embodiment, the bypass resistor RB provides a bypass path $B_y$ for the current supplied to the semiconductor light source 10 at a first end of the second connection node N2. Accordingly the power loss in the N-channel field effect transistor M1 can be reduced in comparison to configurations not provided with the bypass path $B_y$.

In the semiconductor light source lighting circuit 100 of the first exemplary embodiment, the power loss $P_{FET}$ of the N-channel field effect transistor M1 is at a maximum in the second range 204 of the input voltage $V_{IN}$. The maximum value of the power loss $P_{FET}$ is adjusted by adjusting the circuit constants. The peak power to the N-channel field effect transistor M1 can be suppressed to the threshold power loss of the N-channel field effect transistor M1 or lower.

A semiconductor light source lighting circuit 100 configured with the bypass path $B_y$ that employs the bypass resistor RB (a passive element) has a cost advantage over a bypass circuit that employs a second N-channel field effect transistor because an additional component, such as an operational amplifier, is required to control N-channel field effect transistor, resulting in a significantly higher cost in comparison to a resistance element.

Furthermore, an N-channel field effect transistor with large threshold power loss itself is expensive, thus further increasing the cost of the bypass circuit compared to a semiconductor light source lighting circuit 100 of the first exemplary embodiment that employs the bypass resistor RB.

Second Exemplary Embodiment

In a second exemplary embodiment LED current detection is executed on the high side.

Figure 3:
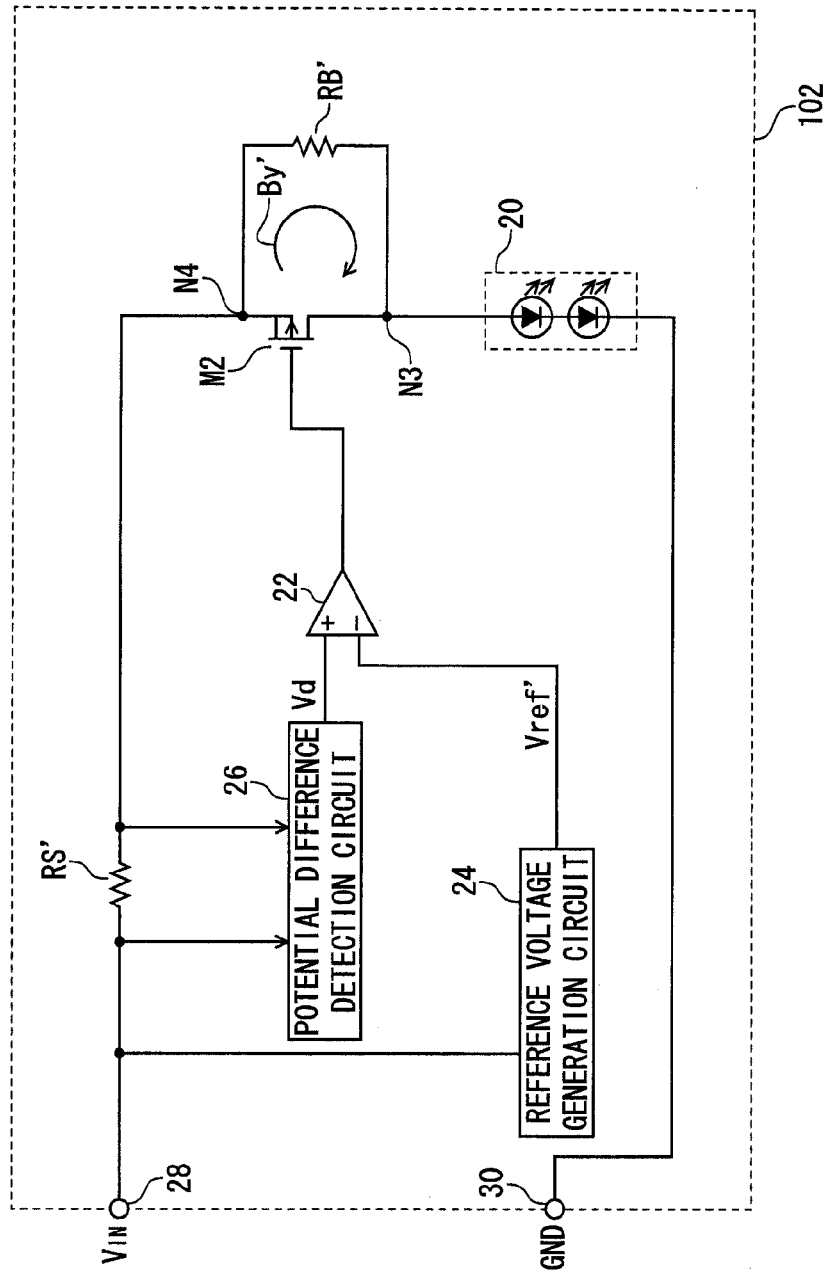
FIG. 3 is a circuit diagram illustrating an example of a semiconductor light source lighting circuit according to a second embodiment.

FIG. 3 is a circuit diagram illustrating a configuration of a semiconductor light source lighting circuit 102 according to the second exemplary embodiment. The semiconductor light source lighting circuit 102 includes a semiconductor light source 20, an operational amplifier 22, a reference voltage generation circuit 24, a potential difference detection circuit 26, an input voltage terminal 28, an earth terminal 30, a P-channel field effect transistor M2, a bypass resistor RB', and an current detection resistor RS'. An input voltage $V_{IN}$, such as a battery voltage, is externally applied to the input voltage terminal 28. The earth terminal 30 is connected to earth.

The semiconductor light source 20 is configured with two LEDs connected together in series. The cathode of one of the LEDs at a first end of the semiconductor light source 20 is connected to the earth terminal 30. The anode of the other LED at the second end of the semiconductor light source 20 is connected to the drain of the P-channel field effect transistor M2 and to a first end of the bypass resistor RB'.

The P-channel field effect transistor M2 and the current detection resistor RS' are provided in series in the path of current supplying the semiconductor light source 20. The source of the P-channel field effect transistor M2 is connected to the second end of the current detection resistor RS', and the second end of the current detection resistor RS' is connected to the input voltage terminal 28.

A control circuit is composed of the operational amplifier 22, the reference voltage generation circuit 24 and the potential difference detection circuit 26. The control circuit controls the P-channel field effect transistor M2 to decrease any difference between a voltage $V_d$, generated by a voltage drop occurring in the current detection resistor RS', and a specific reference voltage $V_{ref}$. The reference voltage generation circuit 24 receives power supplied from the input voltage terminal 28, generates the reference voltage $V_{ref}$ corresponding to the desired LED current and applies the reference voltage $V_{ref}$ to the inverting input terminal of the operational amplifier 22. The potential difference detection circuit 26 detects the potential difference between the two ends of the current detection resistor RS', namely the voltage drop occurring in the current detection resistor RS', and applies a voltage $V_d$ according to this voltage drop to the non-inverting input terminal of the operational amplifier 22. The output terminal of the operational amplifier 22 is connected to the gate of the P-channel field effect transistor M2. The operational amplifier 22 controls the gate voltage of the P-channel field effect transistor M2 so as to decrease any difference between the reference voltage $V_{ref}$ and the voltage $V_d$.

The bypass resistor RB' is provided so as to establish a bypass path By' for the current supplied to the semiconductor light source 20. The bypass path By' has one end at a third node N3 between the drain of the P-channel field effect transistor M2 and the second end of the semiconductor light source 20, and the other end at a fourth node N4 between the source of the P-channel field effect transistor M2 and the first end of the current detection resistor RS'. Namely, one end of the bypass resistor RB' is connected to the third node N3 and the other end is connected to the fourth node N4.

The semiconductor light source lighting circuit 102 of the second exemplary embodiment has similar operation and effect to that of the semiconductor light source lighting circuit 100 of the first exemplary embodiment.

Third Exemplary Embodiment

Figure 4:
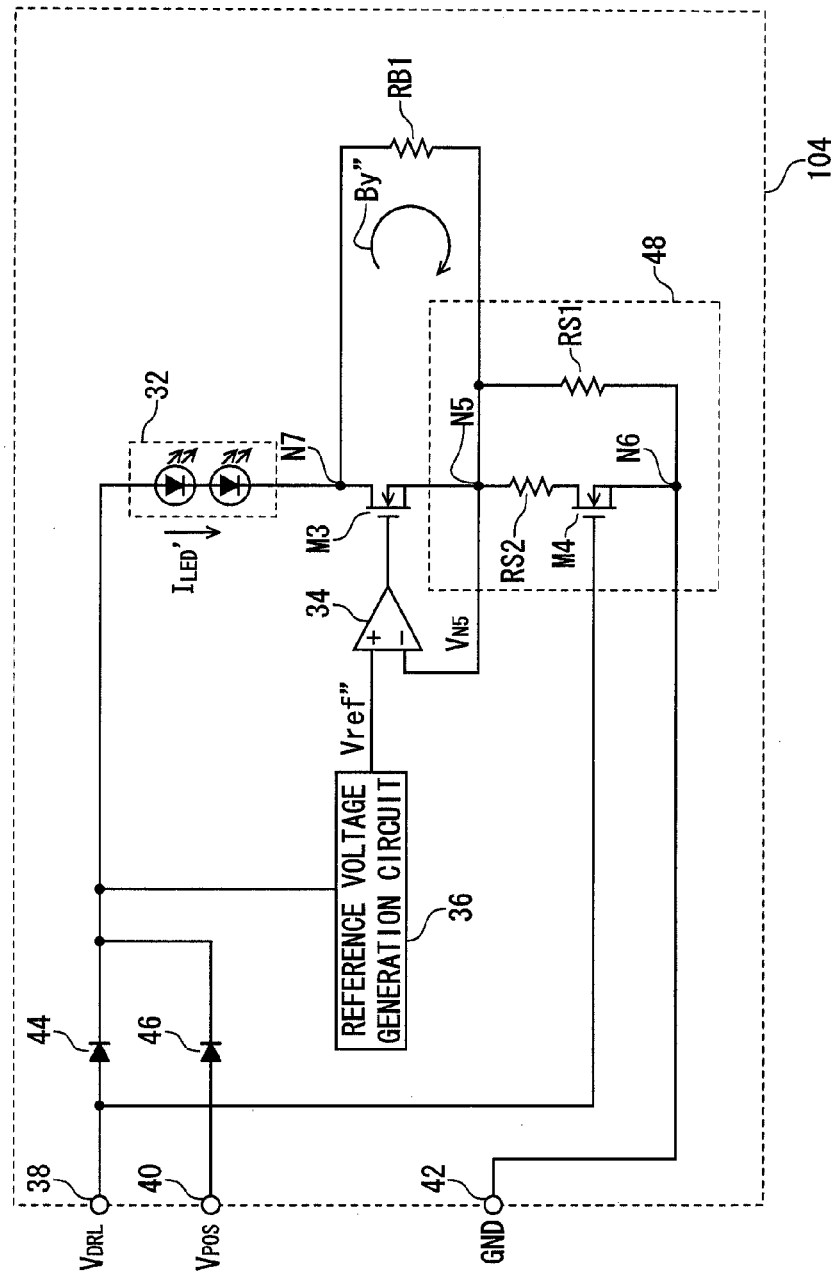
FIG. 4 is a circuit diagram illustrating an example of a semiconductor light source lighting circuit according to a third embodiment.

Lighting modes are switchable in a semiconductor light source lighting circuit 104 according to the third exemplary embodiment by varying the resistance value of a voltage detection resistor. FIG. 4 is a circuit diagram showing a configuration of the semiconductor light source lighting circuit 104 according to the third exemplary embodiment. The semiconductor light source lighting circuit 104 includes a semiconductor light source 32, an operational amplifier 34, a reference voltage generation circuit 36, a Daytime Running Light (DRL) input terminal 38, a POS input terminal 40, an earth terminal 42, a DRL diode 44, a POS diode 46, a first N-channel field effect transistor M3, a bypass resistor $RB_1$ and a current detection circuit 48. The current detection circuit 48 includes a second N-channel field effect transistor M4, a first current detection resistor $RS_1$ and a second current detection resistor $RS_2$.

There is a noticeable recent trend for cars to turn on their own headlights in the daytime, a time band when lighting is normally not required, with a DRL function increasingly being introduced to cars for the purpose of making others, such as by oncoming cars and pedestrians, aware of the car's presence earlier. Since the lighting duration is extended in DRL, there is a tendency to employ LEDs as the light source for DRL due to the generally longer lifespans of LEDs compared to discharge lamps. The semiconductor light source lighting circuit 104 of the third exemplary embodiment is preferably applied as a lighting circuit when an LED light source for DLR is also used as a light source for positioning lamps.

Namely, the semiconductor light source lighting circuit 104 is a lighting circuit for driving the semiconductor light source 32, and is also configured to enable selection of a DRL mode for DRL or a POS mode for use as a positioning lamp.

In the DRL mode a DRL input voltage $V_{DRL}$ for DRL is externally applied to the DRL input terminal 38. In the POS mode a POS input voltage $V_{POS}$ for positioning lamp is externally applied to the POS input terminal 40. The semiconductor light source lighting circuit 104 operates in the DRL mode when applied with the DRL input voltage $V_{DRL}$, and operates in the POS mode when applied with the POS input voltage $V_{POS}$.

The earth terminal 42 is connected to earth.

The semiconductor light source 32 is configured with two LEDs connected in series. The anode of one of the LEDs at a first end of the semiconductor light source 32 is connected to the DRL input terminal 38 through the DRL diode 44, and also connected to the POS input terminal 40 through the POS diode 46. The cathode of the other LED at the second end of the semiconductor light source 32 is connected to the drain of the first N-channel field effect transistor M3 and to a first end of the bypass resistor $RB_1$. The current flowing in the semiconductor light source 32 is denoted as LED current $I_{LED}'$.

In the current detection circuit 48 the second current detection resistor $RS_2$ and the second N-channel field effect transistor M4 are connected together in series, and this serial circuit is in turn connected in parallel to the first current detection resistor $RS_1$. The gate of the second N-channel field effect transistor M4 is connected to the DRL input terminal 38. The second N-channel field effect transistor M4 is ON when the DRL input voltage $V_{DRL}$, is applied to the DRL input terminal 38, and otherwise is OFF.

The first N-channel field effect transistor M3 and the current detection circuit 48 are provided in series in the path of the current supplied to the semiconductor light source 32. The source of the first N-channel field effect transistor M3 is connected to a fifth connection node N5 between a first end of the first current detection resistor $RS_1$ and a first end of the second current detection resistor $RS_2$. A sixth connection node N6 between the source of the second N-channel field effect transistor M4 and the second end of the first current detection resistor RS1 is connected to the earth terminal 42.

The operational amplifier 34 and the reference voltage generation circuit 36 establish a control circuit. The control circuit controls the first N-channel field effect transistor M3 so as to decrease any difference between a voltage occurring in the current detection circuit 48, which is based on the LED current $I_{LED}'$, and a specific reference voltage Vref". The reference voltage generation circuit 36 receives power supplied from the DRL input terminal 38 or from the POS input terminal 40, generates the reference voltage Vref" according to a desired LED current $I_{LED}'$, and applies reference voltage Vref" to the non-inverting input terminal of the operational amplifier 34. A fifth connection node voltage $V_{N5}$ at the fifth connection node N5 is applied to the inverting input terminal of the operational amplifier 34. The output terminal of the operational amplifier 34 is connected to the gate of the first N-channel field effect transistor M3. The operational amplifier 34 controls the gate voltage of the first N-channel field effect transistor M3 so as to decrease any difference between the reference voltage Vref" and the fifth connection node voltage $V_{N5}$.

The bypass resistor $RB_1$ is provided so as to establish a bypass path By" for the current supplied to the semiconductor light source 32. The bypass path By" has one end at a seventh connection node N7, between the drain of the first N-channel field effect transistor M3 and the second end of the semiconductor light source 32. Another end of the bypass path By" is at the fifth connection node N5. Namely, the first end of the bypass resistor $RB_1$ is connected to the seventh connection node N7 and the second end of the bypass resistor $RB_1$ is connected to the fifth connection node N5.

Operation of the semiconductor light source lighting circuit 104 in the DRL mode is based on the operation of the semiconductor light source lighting circuit 100 of the first exemplary embodiment with the resistance value of the current detection resistor RS changed according to:

$$RS1 // RS2 = \frac{RS1 \cdot RS2}{RS1 + RS2}. \quad \text{Equation (14)}$$

Operation of the semiconductor light source lighting circuit 104 in POS mode is based on the operation of the semiconductor light source lighting circuit 100 of the first exemplary embodiment in which the resistance value of the current detection resistor RS is replaced by the resistance value of the first current detection resistor $RS_1$.

Similar operation and effect is obtained by the semiconductor light source lighting circuit 104 of the third exemplary embodiment to that of the semiconductor light source lighting circuit 100 of the first exemplary embodiment.

In addition, the LED current in semiconductor light source lighting circuit 104 of the third exemplary embodiment has a constant value of:

$$I'_{LED} = \frac{V''_{ref}}{RS1 // RS2}, \quad \text{Equation (15)}$$

for the DRL input voltage $V_{DRL}$ in the DRL mode. However, the LED current has a constant value of:

$$I'_{LED} = \frac{V''_{ref}}{RS1}, \quad \text{Equation (16)}$$

for the POS input voltage $V_{POS}$ in the POS mode. Accordingly, switching the resistance value of the current detection circuit 48 using the second N-channel field effect transistor M4 enables a change in light output between a DRL mode and a POS mode.

Explanation is given above of the configurations and operation of semiconductor light source lighting circuits according to exemplary embodiments. However these are merely exemplary embodiments and a person of skill in the art will be aware that various modified examples are possible by combinations of configuration elements and processing, and such modified examples fall within the scope. Combinations may also be made between the exemplary embodiments themselves.

The control of LED current, as described herein, is based on the use of field effect transistors. However, other transistors also could be used. For example, N-channel field effect transistors may be replaced with NPN bipolar transistors, and P-channel field effect transistors may be replaced with PNP bipolar transistors.

What is claimed is:

1. A semiconductor light source lighting circuit comprising:
   a transistor and a current detection resistor in series in a semiconductor light source current supply path;
   a control circuit arranged to control the transistor so as to decrease any difference between a voltage occurring at the current detection resistor and a reference voltage during operation of the semiconductor light source lighting circuit; and
   a bypass resistor arranged to establish a bypass path for current supplied to a semiconductor light source, wherein a first end of the bypass path is located at a connection node between the transistor and the semiconductor light source;
   wherein the current is divided such that a portion of the current flows into the transistor and another portion of the current flows into the bypass resistor when an input voltage to the semiconductor light source lighting circuit is within an operation range; and
   wherein the operation range is the range of values for the input voltage over which the size of the current flowing in the transistor changes according to changes in the input voltage.

2. The semiconductor light source lighting circuit of claim 1, wherein a power loss in the transistor is at a maximum within the operation range.

3. The semiconductor light source lighting circuit of claim 1, further comprising change means for changing resistance value of the current detection resistor.

4. A method of controlling a semiconductor light source lighting circuit configured to supply current to a semiconductor light source, the method comprising:
   controlling one or more circuit elements in the semiconductor light source lighting circuit to provide:
   a first range of input voltages over which an amount of current flowing in a transistor that is located in a path of current supplied to the semiconductor light source lighting circuit changes with changes to an input voltage to the semiconductor light source lighting circuit; and
   a second range of input voltages, on the high voltage side of the first range, over which a power loss in the transistor is smaller than the maximum value of power loss in the transistor within the first range, the second range including values on the high end of the first range.

5. A semiconductor light source lighting circuit comprising:
   a transistor and a current detection resistor in series in a semiconductor light source current supply path;
   a control circuit arranged to control the transistor so as to decrease any difference between a voltage occurring at the current detection resistor and a reference voltage during operation of the semiconductor light source lighting circuit; and
   a bypass resistor arranged to establish a bypass path for current supplied to a semiconductor light source, wherein a first end of the bypass path is located at a connection node between the transistor and the semiconductor light source;

wherein a power loss in the transistor is at a maximum within an operation range, the operation range being the range of input voltages over which the size of the current flowing in the transistor changes according to changes in input voltage to the semiconductor light source lighting circuit.

* * * * *